(12) United States Patent
Fox et al.

(10) Patent No.: US 10,895,084 B2
(45) Date of Patent: Jan. 19, 2021

(54) ENTERTAINMENT VENUE AND ASSOCIATED SYSTEMS/METHODS

(71) Applicant: Willowbrook Capital Group, LLC, Los Angeles, CA (US)

(72) Inventors: Steve Fox, Los Angeles, CA (US); Albert Vass, Los Angeles, CA (US)

(73) Assignee: WILLOWBROOK CAPITAL GROUP, LLC, Los Angeles, CA (US)

( * ) Notice: Subject to any disclaimer, the term of this patent is extended or adjusted under 35 U.S.C. 154(b) by 0 days.

(21) Appl. No.: 16/515,958

(22) Filed: Jul. 18, 2019

(65) Prior Publication Data

US 2020/0115914 A1    Apr. 16, 2020

Related U.S. Application Data

(63) Continuation of application No. 15/244,051, filed on Aug. 23, 2016, now abandoned, which is a
(Continued)

(51) Int. Cl.
| | |
|---|---|
| *E04H 3/24* | (2006.01) |
| *H04N 13/31* | (2018.01) |
| *E04H 3/30* | (2006.01) |
| *G03B 21/56* | (2006.01) |
| *G03B 21/60* | (2014.01) |
| *H04R 27/00* | (2006.01) |
| *H04N 13/363* | (2018.01) |
| *H04R 1/02* | (2006.01) |

(Continued)

(52) U.S. Cl.
CPC ............. *E04H 3/24* (2013.01); *E04B 1/3211* (2013.01); *E04H 3/30* (2013.01); *G03B 21/56* (2013.01); *G03B 21/60* (2013.01); *H04N 9/3147* (2013.01); *H04N 13/31* (2018.05); *H04N 13/363* (2018.05); *H04R 1/02* (2013.01); *H04R 1/026* (2013.01); *H04R 27/00* (2013.01); *E04B 2001/0061* (2013.01); *H04N 2213/001* (2013.01); *H04R 2227/001* (2013.01); *H04R 2499/15* (2013.01)

(58) Field of Classification Search
CPC ...... A63J 1/00; A63J 1/02; E04H 3/00; E04H 3/10; E04H 3/24; E04H 3/26; E04H 3/30; H04R 1/00; H04R 1/02; H04R 27/00; A63G 31/00; A63G 312/02; A63G 31/16
USPC .......... 472/58–64, 75–80, 130, 136; 52/6–10
See application file for complete search history.

(56) References Cited

U.S. PATENT DOCUMENTS

| | | | | |
|---|---|---|---|---|
| 5,765,314 A | * | 6/1998 | Giglio | ............... E04H 3/126 472/75 |
| 6,253,494 B1 | * | 7/2001 | Shaffron | ............... E04H 3/22 52/64 |

(Continued)

*Primary Examiner* — Kien T Nguyen
(74) *Attorney, Agent, or Firm* — Foley & Lardner LLP

(57) ABSTRACT

A venue includes a display screen, a performance stage, and an audience area. The display screen has (i) an inner periphery, (ii) an outer periphery, and (iii) at least one of a non-linear or a curved cross-sectional shape that is at least partially revolved around a center point. The performance stage (i) is positioned between the inner periphery and the outer periphery of the display screen and (ii) at least partially extends along at least one of the inner periphery or the outer periphery of the display screen. The audience area is positioned between the inner periphery and the outer periphery of the display screen.

15 Claims, 8 Drawing Sheets

Related U.S. Application Data continuation of application No. 14/586,102, filed on Dec. 30, 2014, now Pat. No. 9,422,736, which is a continuation of application No. 14/183,231, filed on Feb. 18, 2014, now Pat. No. 8,926,441.

(60) Provisional application No. 61/766,592, filed on Feb. 19, 2013.

(51) Int. Cl.
*E04B 1/32* (2006.01)
*H04N 9/31* (2006.01)
*E04B 1/00* (2006.01)

(56) References Cited

U.S. PATENT DOCUMENTS

| | | | | |
|---|---|---|---|---|
| 6,909,543 B2* | 6/2005 | Lantz | ............ | G03B 21/00 |
| | | | | 348/36 |
| 8,206,230 B2* | 6/2012 | Magpuri | ............ | A63G 31/14 |
| | | | | 472/60 |
| 8,241,133 B1* | 8/2012 | Lewis | ............ | A63G 31/16 |
| | | | | 472/59 |
| 8,490,550 B2* | 7/2013 | Crawford | ............ | A63G 7/00 |
| | | | | 104/63 |
| 2015/0065260 A1* | 3/2015 | Beyr | ............ | A63G 31/16 |
| | | | | 472/60 |

\* cited by examiner

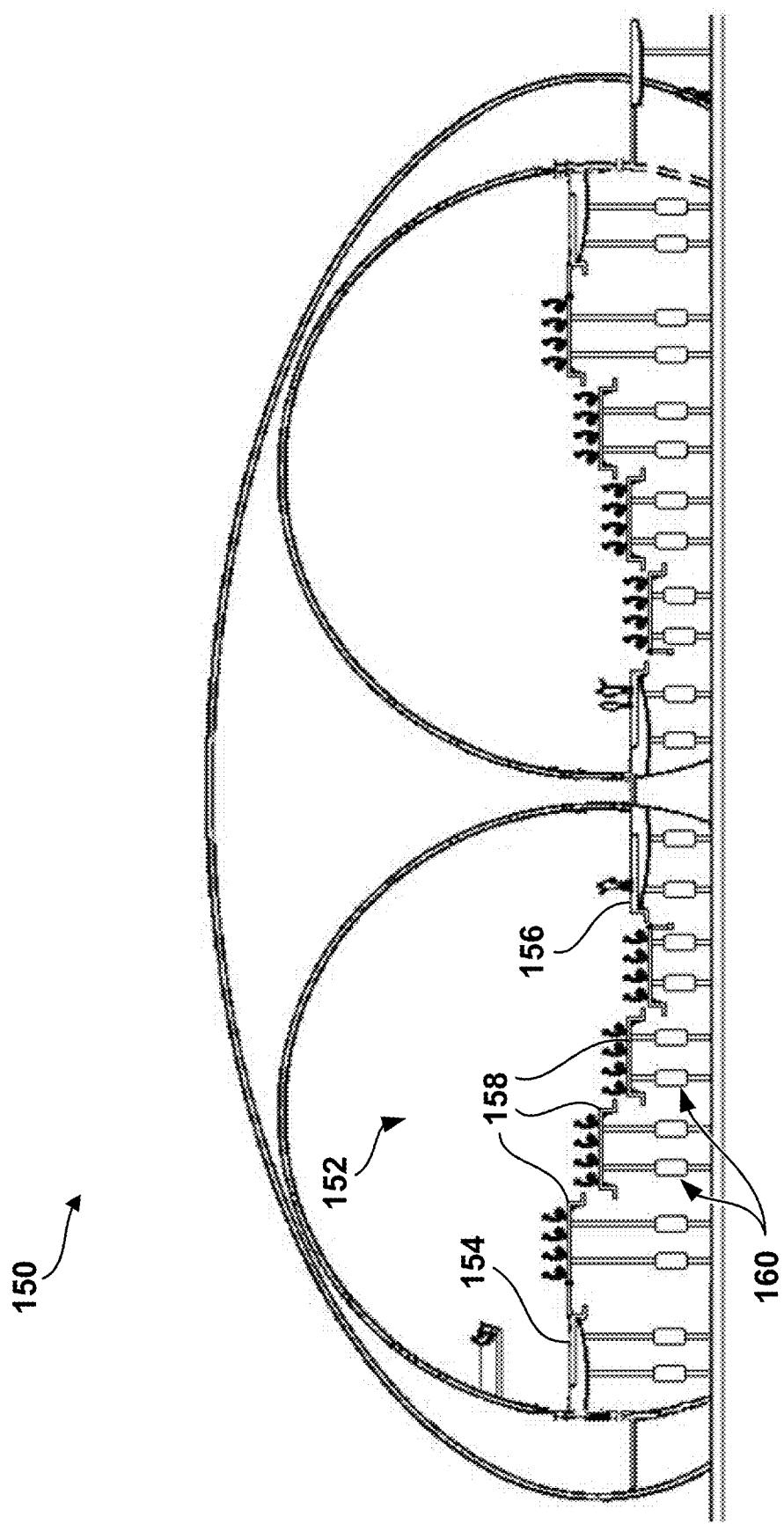

ENTERTAINMENT VENUE AND ASSOCIATED SYSTEMS/METHODS

CROSS-REFERENCE TO RELATED PATENT APPLICATIONS

This application is a continuation of U.S. application Ser. No. 15/244,051, filed Aug. 23, 2016, which is a continuation of U.S. application Ser. No. 14/586,102, filed Dec. 30, 2014, which is a continuation of U.S. application Ser. No. 14/183,231, filed Feb. 18, 2014, which claims the benefit of and priority to U.S. Provisional Application No. 61/766,592, filed Feb. 19, 2013, all of which are incorporated by reference herein in their entireties.

SUMMARY

Described herein is an entertainment venue, currently called "Rockdome," that provides for enhanced events including the capability to present live and/or pre-produced performances simultaneously or independently, musical and feature film productions, in an accompanying immersive environment. In one embodiment described in detailed herein, the entertainment venue includes an Immersive Display Screen (or "IDS") theater screen. Enclosed within the IDS, the venue includes a centrally located, outfacing audience area with standing room, seats raked up toward the center of the audience area, a plateaued VIP bar and seating area in the center, and a mezzanine bar/lounge recessed under the seating about half way up to the VIP section, and beneath it. A performance stage encircles the outside of the audience area, and/or the perimeter of the immersive environment, enclosed within the IDS, located between the screen and the audience.

In another embodiment further described herein, an example method involves presenting a live and/or pre-produced video on the IDS. This method may involve providing a live performance on the performance stage inside the IDS. In this example method, the live performance may or may not be associated with presented video images and/or any other type of running video content beyond just images (still and moving).

In yet another embodiment, a "Compositing Screen" is an example of an immersive display screen, which includes a secondary back screen (behind the above mentioned screen) that uses light emitting diodes (LEDs) or another video producing technology (e.g., lasers, rear projection, front projection, and/or a yet to be defined light source) to display a rear produced image. The back screen is toroidal in shape and may be equidistant from the front screen. The LEDs (or an alternative technology) point towards the inside of the toroid defining a second layer, or back screen. The display may also include a front screen that is positioned on the inside of the back screen, and is transparent or seemingly transparent in nature (i.e. glass or plastic), or partially transparent (i.e., perforated material, semi-opaque front or rear projection film adheased to ETFE or another plastic, or mesh, etc.). The front screen may be toroidal in shape, and contains a front image, projected from a laser projector, while light from the back screen shines through the front screen to provide a "composite" image effect for the audience (i.e., the audience sees both layers of imagery simultaneously).

The performance stage includes a ring-shaped performance platform. The performance stage includes a solid structure supporting the platform. Between the front part of the platform and the support structure, the stage includes a movement mechanism, (e.g., including rollers and timed automation), which is designed to move the performance platform in a circular movement pattern across the supports. In an example embodiment, the rear of the platform remains fixed and includes stage lifts (elevators), support for robotic screens and accompanying tract, and other performance and exhibition equipment.

The foregoing is a summary and thus by necessity contains simplifications, generalizations and omissions of detail. Consequently, those skilled in the art will appreciate that the summary is illustrative only and is not intended to be limiting. Other aspects, inventive features, and advantages of the various elements, devices, and/or processes described herein will become apparent in the detailed description set forth herein and taken in conjunction with the accompanying drawings.

BRIEF DESCRIPTION OF THE FIGURES

FIG. 1B is a layout design of an exemplary venue with moveable seating.

DETAILED DESCRIPTION

Figure 1:
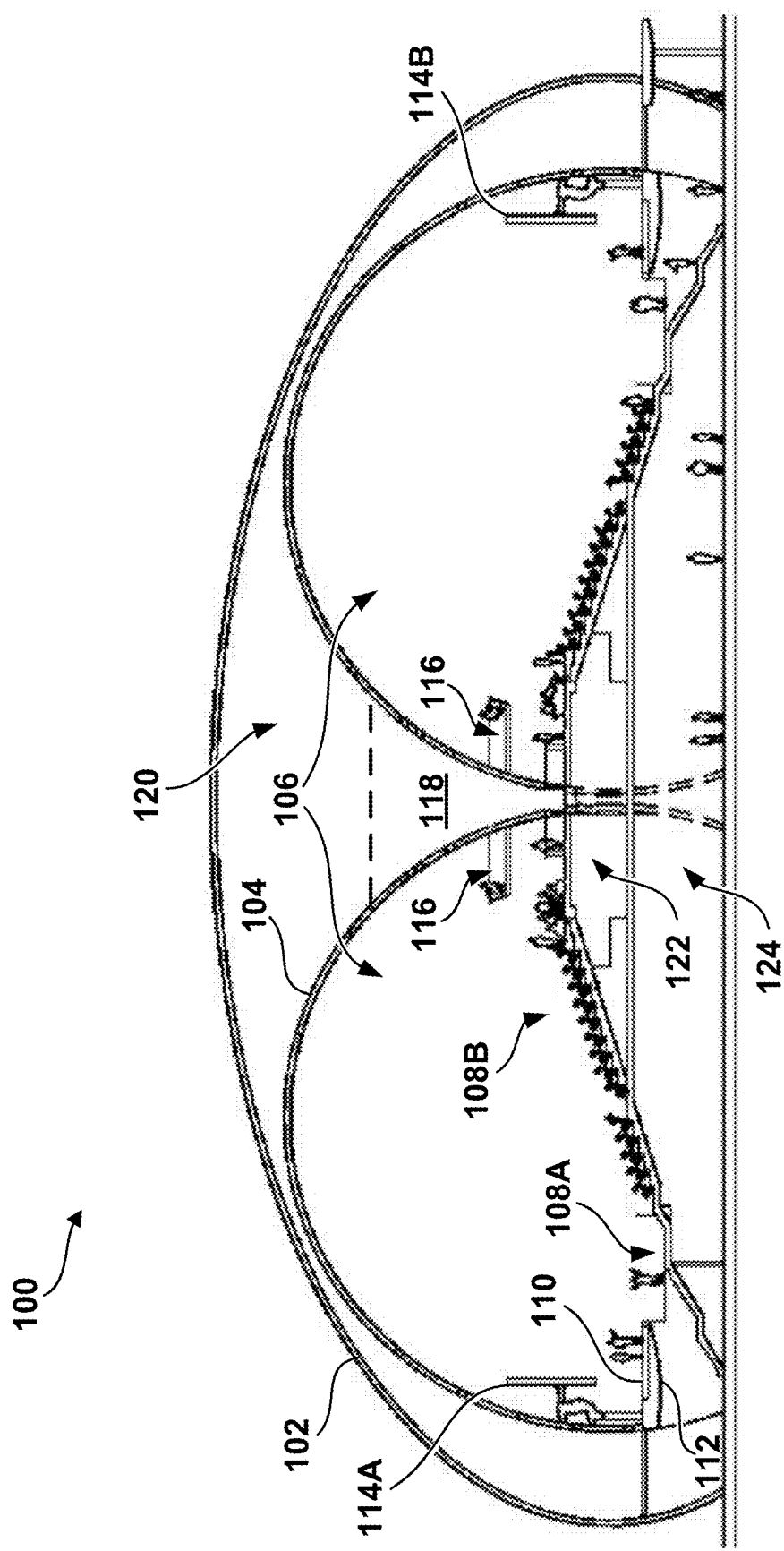
FIG. 1 is a layout design of an exemplary venue with a one-screen 360° theater IDS embodiment.

Referring generally to the figures, an entertainment venue is described herein along with systems and methods for use in implementations of the described venue. In an exemplary embodiment, the venue may include a ring shaped stage (mobile and/or stationary) for live performances, a contiguous IDS (or dual screens providing a "composite" image—the "Compositing Screen") occupying substantially the entire visible surface area of the torus which encases the audience (Standing Room and seating areas for GA and VIP guests), and separate display screens (or lasers, holograms, Pepper's Ghost, OLED or other high definition monitors, or other exhibition systems) for presenting video or graphics to an audience. By combining live and displayed presentations, the venue may provide an immersive guest experience, among other advantages. The combination of live performance areas, open audience areas, and immersive screens also provides a venue that can be suited to diverse forms of entertainment. The venue may be designed such that the stage(s) and screens are positioned around the outside of an audience area. Because the stage/screens may encircle the audience, this arrangement may be considered an inversion of the "theater-in-the-round" design (in which the audience surrounds a stage). In an exemplary embodiment, the entirety of a front portion of the stage may be movable around the audience, and/or the entirety or portions of the seated audience area may be movable (rotated, vibrated, and/or moved on all three axes) within the area circumscribed by the stage. In this way, different sections of the audience (or guests) may be provided with different views of the performers, from different angles at different times. Additionally, some screens or display surfaces may be moveable around the audience. In some architectures, a toroidal screen may enclose the audience area, providing an IDS. Many other features and advantages of the venue will be described in the following sections.

The following description is divided into three sections: (1) Venue Architecture and Design, (2) Venue System Design and Implementation, and (3) Venue Use. The venue architecture section describes the physical design and layout of an example venue and theaters within the venue. The venue system design section describes some of the systems, techniques, and visual devices that are used to facilitate the venue's functions. The venue use section describes a few of the novel ways that an exemplary venue may be used. Additional information and disclosure regarding the stage, audio, and display technology that may be used in combination with the embodiments disclosed herein may be found in copending U.S. application Ser. No. 14/183,208 (entitled "Immersive Sound System"), U.S. application Ser. No. 14/183,077 (entitled "Rotating Performance Stage"), and U.S. application Ser. No. 14/183,162 (entitled "Compositing Screen"), which are incorporated herein by reference.".

Venue Architecture and Design

FIG. 1 shows one embodiment of an entertainment venue 100. As shown, venue 100 includes a dome-shaped exterior 102 over a torus-shaped interior structure 104 that encloses a theater area 106. Theater area 106 includes various levels of audience standing 108A and seating 108B, a stage 110 with supporting structure 112, multiple secondary screens 114A and 114B (such as robotic screens or other fixed or movable exhibition systems), and one circular, contiguous crow's nest 116 (which may be fixed or rotating/movable). Although two secondary screens are shown in FIG. 1, any other number of screens/exhibition systems may be used. In one embodiment, for example, as many as twenty-four robotic screens may be used. Additionally, any number of crow's nest structures may be used. For example, crow's nest 116 may be implemented as two segments of a single crow's nest structure, each reflecting 180° of the Torus, or half. In addition to theater area 106, FIG. 1 shows other areas of venue 100, including, torus-center area 118, open dome area 120, mezzanine and mezzanine bar area 122, and ground floor 124. Torus-center area 118, and/or the other open portions below enclosure 102 (e.g., open area 120), may house various mechanical, audio/visual, utility, and other elements that support the functions of venue 100. For example, projectors, speakers, cabling, switching systems, plumbing, HVAC, safety equipment, ladders, catwalks, cameras, stage lighting, house lighting, Emergency Exit signs, rigging, and/or control stations, among other possibilities, may also be held in torus-center area 118. Mezzanine area 122 may house a bar/lounge, additional seating, dining, food and beverage sales, merchandise sales, Mezzanine area 122 and ground floor 124 may house businesses, services and/or storage, Back Of House, video production, green rooms, etc., which may or may not be accessible to guests of the venue.

Since the torus-shaped interior structure 104 and enclosed theater area 106 are toroidal (or alternatively, ellipsoidal, spherical, or domed in shape), FIG. 1 shows theater area 106 (along with corresponding portions of standing 108A, seating 108B, stage 110, and supports 112) in two segments. In an example embodiment, the arrangement of the torus-shaped interior structure 104, theater area 106, standing 108A, seating 108B, and stage 110 may continue around the circumference of the toroidal shape, with secondary screens placed at intervals around the stage (e.g., 12 or more different robotic screens). The robotic screens can either be attached to the actual base of the stage or moved independent of the stage on their own track or tracks, which may be attached to the Torus structure itself or attached to the rear (upstage) portion of the stage. Telescoping robotic arms attached to these screens may move them up, down, and in different directions so as to form different configurations of screen raids—i.e., 2×2, 3×2, etc. As will be described in the following sections, various alternative embodiments may include fewer, additional, or different elements than the arrangement shown in FIG. 1.

Among other advantages, the venue design supports many different uses and combinations of events without requiring extensive preparations. For example, the same theater area may show a movie in the afternoon, present a live show in the evening, or a live concert performance, and then transform into a nightclub after-hours, without the need for significant "change over" between events. As another example, the venue may be used for a combination of events, such as a nightclub with a stage or DJ show, a movie that is complimented with a live concert (or pre-recorded concert), and/or another live stage performance or performances. The venue design, therefore, allows promoters and/or entertainment providers more flexibility to create new opportunities for content display and presentation, and provides a novel platform for mixed medium presentations, combining a concert and a movie for instance, or a DJ or band performance with art created in real time by a visual artist. Other uses for the venue may include conventions, motion simulation rides, video game expositions, video game competitions, film and television show productions, circus, dance, live simulcast of sporting events (NASCAR, NFL), a large sports-book experience, corporate events such as shareholder meetings, company retreats, product launches, fashion shows and much more. The venue also allows management flexibility to change event schedules more quickly in response to changing trends and new available content. Furthermore, the inverted-theatre-in-the-round seating arrangement, and the close proximity of the audience to the stage (versus a conventional stage/seating arrangement), creates a more intimate, engaging, one-on-one experience.

I. Exterior Enclosure

One embodiment of an external enclosure is a "dome" shaped shell enclosing the indoor toroidal enclosure and various theater features of the entertainment venue. FIG. 1 shows such an implementation, in which the exterior shell is in the shape of an ellipsoid. Other example embodiments could include spherical, hemispherical, rectangular, cubic, pyramid shaped, toroidal, conical, or other shape of exterior enclosures. In some cases, the implementation of the shell exterior may be supported separately from the display screen to handle various loads, such as wind loads that will not be a requirement for the internal enclosure. In other implementations, the display screen and exterior may be supported by connected rigging to the interior structure, as a function of load support or stationary support. Structural supports for the exterior ellipsoid or internal torus, the display screen, rear screens (if applicable), speakers, lighting, A/C, heat, ducting, rigging and more may include various internal framing components, framing support and/or external superstructural components.

In some embodiments, the external enclosure may include external display features. For example, a complete or partial projection surface, display screens, LEDs or other visual components may adhere or be attached to portions, or the entirety, of the external surface of the enclosure. As another example, display elements may be affixed onto or into the exterior surface of the enclosure or cast/projected upon by non-attached projection devices and/or lights. In one such implementation, LEDs may be embedded inside, adhered onto, or attached on a majority of the external surface of the enclosure, allowing for large-scale displays over the outside surface of the venue. As another example, visual content may be front (or rear) projected onto the exterior surface with no physical attachments whatsoever. As another example, the external enclosure may be transparent or translucent in nature with LEDs embedded into (or behind) the actual enclosure surface in select areas or throughout for large-scale displays within or behind a transparent surface of the venue, and another embodiment may be the compositing of two images, one produced either by lining or backing a transparent external structure with projection film, or LEDs, and also projecting upon the back of the internal structure or torus, such that that projection may be seen from the outside through the external structure—thereby compositing two images (in the case of LEDs, they would be mounted to a "transparent" panel, that allowed one to see what was behind it—in this case, imagery projected on the back of the torus).

The material of the enclosure may need to resist any and all environmental conditions both known (e.g., rain, snow, wildlife, heat, UV rays, etc.) and unforeseen (e.g. tornados, hurricanes, earthquakes). If the external enclosure or dome includes any type of display elements, such as LEDs, the final material may be selected for its optimal optical qualities as well as protection from the elements. For example, a transparent exterior material such as glass, ETFE, plastic, or other may be chosen, along with a UV coating, to protect the display elements without blocking the display or interfering with the transparent nature of the structure. In other embodiments, transparent material may be used to cover larger portions of the enclosure or the enclosure in its entirety, allowing inside features of the venue to be visible from the outside. For example, large transparent sections of enclosure 102 may allow passersby to see the exterior of the torus-shaped interior structure 104 (which we may also front project upon). If the toroidal structure is transparent (i.e., front projection film backed ETFE) in a one-screen scenario, images or video on the torus-shaped interior structure 104, or 106, may provide entertainment to viewers both inside and outside of theater area 106 simultaneously. Additionally or alternatively, the torus-shaped interior structure 104 may be partially transparent as well, allowing outside spectators to view some of the entertainment provided within the venue, albeit partially or fully obstructed depending on the vantage point of the spectators. Complete or partial performances inside the theatre area 106 may also be simultaneously displayed on enclosure 102 or other external surfaces.

Although FIG. 1 shows enclosure 102 housing a single theater area 106, an example entertainment venue may include multiple theater areas (e.g., multiple viewing areas with similar or different content, within the single theater). Each respective theater area, if separated, may include its own display screens, performance stages, and/or other features to facilitate all entertainment activities.

In addition to enclosing one or more theater areas, the building may house complementary businesses and services, such as restaurants, bars, lounges, gift shops, ticket vendors, bathrooms, merchandise areas, elevators, ADA accessible areas, ramps, retail shops, etc. For example, the design shown in FIG. 1 includes mezzanine area 122 and ground floor 124, which may house such businesses and services. The venue may also include outdoor features and areas for spectator viewing (viewing areas, platforms, podiums, etc.) such as, for example, for the aforementioned internal and external displays. Among other advantages of this design, the self-contained, uniquely shaped structure may contribute to the immersive guest experience by surrounding guests in an atmosphere of entertainment.

Various embodiments of the exterior's visual exhibition system maybe LED's on transparent panels inside or behind glass or ETFE (or other plastic) which are graded in pitch, so as to become spaced further apart as the cover higher areas of the exterior; front and/or rear projection on glass or ETFE (or similar) backed with a semi opaque projection film; opaque versions of either; or a clear exterior which can be illuminated by lighting. The semi-opaque and clear versions of the foregoing can afford the viewer on the outside the opportunity to see through them to view events and images on the interior. In certain cases (such as images being projected on the back of the torus), such a combination would create a composite image viewable from the outside (i.e., a front projected moving image on the torus composited with an image produced by LEDs on transparent panels mounted to the interior of the ellipsoid). (Or in an alternate method of compositing an image, an LED covered interior back of torus could be viewed through a clear (glass/ETFE), projection film backed external skin).

II. Audience Area

An audience area may be provided inside any of the theater areas. As shown in FIG. 1, the audience area may include a standing room area (SRO) 108A and various seating areas 108B for audience members of both General Audience (GA) or (VIP) areas. The audience area may also include open spaces or non-obstructed spaces to be used interchangeably in accordance with particular entertainment events. For example, open areas may be used as dance floors, orchestra pits, security zones, theatrical displays, non-permanent seating additional stage areas (such as trusses, jets), additional lighting or sound rigs, pyrotechnic or lighting displays, smoke, smog, live actors or stage performers, among other examples. In some embodiments, the entire audience area may rotate either in lieu of, or in combination with, the actual stage rotating. In another embodiment, select audience areas may contain motion seats.

In an exemplary embodiment, the audience seating 108B may face outward from a central area of the theater. In some embodiments, each seat may be oriented in a direction facing away from a central point. In other embodiments, rows of seats may face substantially outward although each individual seat may not face directly outward. In still other embodiments, seat direction may be changeable, movable or interchangeable, or entire sections may be changeable, movable, or interchangeable. For example, seats may be able to rotate, or have some degree of motion (a third sensory element—movement).

Seats with changeable orientation may freely rotate, allowing the audience to turn their own seats during an event, or the orientation of the seats may be changeable by technology or programming to facilitate different events. For instance, to prepare for a show in which the action takes place on a central active area of the stage at any given moment, seats may face or move to the active area of the stage, or mirror the actions of the content, live performance, movie, or other, rather than move in one specific direction. In some implementations, the entire platform, or partial sections of the platform, upon which the seats rest could move.

Although many example embodiments in the disclosure present a theater area in which a circular stage surrounds an outward-facing audience, a theater of the present invention can alternatively be configured to have the audience face inward towards a circular center stage. The seating, comprised of concentric rings, can be made to face inward, and rake up from the center, by lowering the center rings on which the circular rows of seating reside, and raising the outer rings. In the fashion, the venue can be easily and quickly converted to accommodate either seating configuration. These moving concentric rings (each of which is flat, and may house one or more rows of seating) can also be rotated, and moved up and down in synchronization with the projected imagery to enhance the audience experience with engagement of a third sense (motion), in addition to sight and sound.

FIG. 1B shows an example venue arrangement including such movable seating areas. As shown in FIG. 1B, a venue 150 may include a theater area 152 including two stages 154 (outside stage) and 156 (inside stage). In other embodiments, a single stage may be used at one time. Also as shown in FIG. 1B, the audience-seating platform 158 (or multiple platforms) may be mounted on movable supports 160. Such supports may include lifting/lowering mechanisms to control the height of individual sections of the seating. In this way, the seating may change from raking outward to raking inward in order to present different types of performance/visual presentations.

The audience seating may include any or all of four main sections: i) a GA (general admission) in which the audience stands (this may encircle the seated audience members and make them feel immersed in party environment); ii) a seated section configured with inverted (i.e., convex) banquette style seating (without armrests or separation between seats. These seats may face seatbacks of the row in front of them with a recessed bar/counter for drinks, food, etc., creating a lounge environment; iii) chaise style reclined couches and seating, surrounded on three sides with 3 foot high open and closable fabric walls, such that when reclined, the audience member(s) may have a degree of privacy; and iv) VIP booths at the top, each surrounded by 6 foot high glass with open and closable fabric walls, each booth outfitted with chaises, couches, coffee tables, and other such furnishings. The VIP section may have a common bar area in the center (the center of the venue), and may have a common balcony surrounding and connecting all the VIP booths. Each aforementioned level of seating may be successively more private, spacious, luxuriously appointed, and expensive. All may have the ability to access and order food and beverages. The overall effect of the combined seating program may to meld the atmosphere of a club or lounge with the exhibition of a show and/or movie, creating a novel hybrid event.

In another embodiment, all seating may be removed and the entire audience will stand, or VIP sections can have couches, etc. on a raised movable platform.

III. Performance Stage

One or more performance stages may be provided in each of the venue's theater areas, as opposed to one continuous stage. As shown in FIG. 1, a performance stage may include a rotating ring-shaped stage encircling the audience area 110. This stage may be split into multiple rotating stages, as in multiple stages at the half or quarter marks of the venue's radius. The stage 110 may also be split in itself, where one-portion of the stage (e.g., front ⅔rds, front half, or back ⅓, etc.) may rotate, where the other portions may remain stationary, creating different visual effects, and providing for lifts, robotic screen tract support, etc. As another example, theaters which are not circularly symmetric may include stages that fit to the particular geometry of the room such as cubic or square shaped. In a theater area with more than one performance stage, the multiple stages may include various types of stages in addition to, or instead of, multiple instances of one type of stage. In some embodiments, a movable performance stage may be used. For example, ring-shaped performance stage 110 may be designed to controllably rotate around the outside of theater area 106 or stand still. This movement may be uniform in speed or changeable. For example, stage 110 may either continuously move throughout the performance or stop periodically so that portions of stage 110 are directly in front of particular audience sections. The motion of the stage can be synchronized with the projected visuals so as to cause the audience to feel that it is they who are moving. The stage can also speed up or slow down, depending on need. In other embodiments, a performance stage may be designed to move vertically or into/away from the audience area, such as the front two thirds of the stage extending into the audience where the back third remains motionless.

The speed and pattern at which a performance stage moves may be chosen based on various factors. For instance, the speed and direction may be synchronized with visual content projected behind the stage, or the typical speed and pattern may be dictated by industry standards, labor standards, technical considerations, and/or theater dimensions. Additionally, performance-specific movements may be chosen in accordance with, for example, audience preference, preference of performers, director choices, and/or audience arrangement. As an example of an audience-arrangement-based decision, when portions of the theater contain no audience, the movement pattern may be selected to avoid these portions.

IV. Display Screens

All configurations of display screen (some of which follow) may be fed images via array processing for video delivery, this being a single image that is made up of an array of visual components that are processed in a matrix fashion for presentation over a pre-calculated geometric screen, with compensation for curvature of viewing and light reflectivity.

In addition, every system described herein includes 3-dimensional control of visual elements to be delivered in multiple locations simultaneously. That is, the delivery of visual elements for live presentations may be actively controlled relative to their position to the audience and the performer.

FIG. 1 shows three example categories of screens that an exemplary venue may include: opaque or semi opaque front screen (torus-shaped interior structure 104), LED lined back screen (Ellipsoidal screen 102), and secondary screens (robotic or other screens 114A and 114B). Different embodiments may include other types, layers, and numbers of screens. For example, some embodiments may include only a front theater screen but no secondary screens. As another example, multiple robotic screens may also be used throughout the single theater area, and come together as one image via a "raid".

FIG. 1 shows a torus-shaped interior structure 104 as an example of a theater screen. Since torus-shaped interior structure 104 wraps around the audience in a way that immerses the viewers in a contiguous display surface, this type of screen may be considered an Immersive Display Screen (IDS). In other implementations, the IDS could be various other shapes, including spherical, hemispherical, rectangular, cubic, pyramid shaped, conical, prismatic, and cylindrical, among others. This screen could also be comprised of multiple layers, such as perforated aluminum intended to both reflect a front projected moving image, and to allow light to pass through from an LED wall behind it which exhibits different visual content (a "Compositing Screen"). Additionally or alternatively, some embodiments may use non-immersive theater display screens. Although torus-shaped interior structure 104 is shown as a single continuous screen with no gaps, example screens may include multiple screen pieces arranged to function as a single display screen. In some arrangements, the IDS may include non-screen areas within the screen surface, while still being considered a single screen, meaning some of the IDS may display content where other areas of the screen may not. For example, torus-shaped interior structure 104 may have supporting structures rather than active display areas behind it, as a secondary screen 114A, and still be considered substantially continuous.

Figure 2:
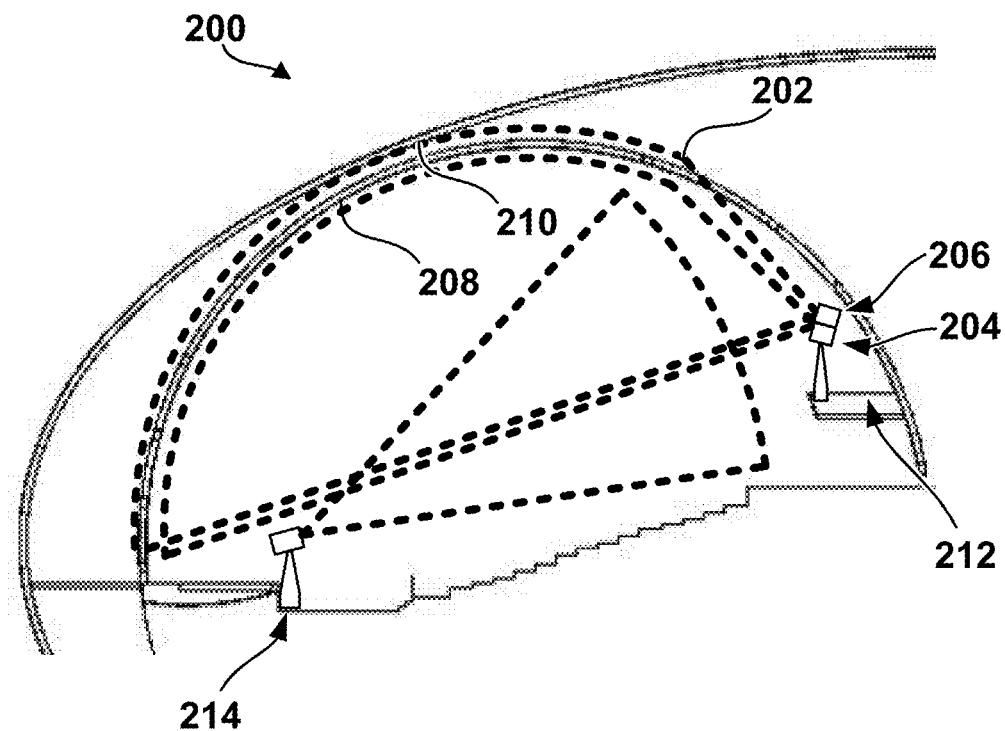
FIG. 2 illustrates an example front-projection arrangement for a theater area.
Figure 3:
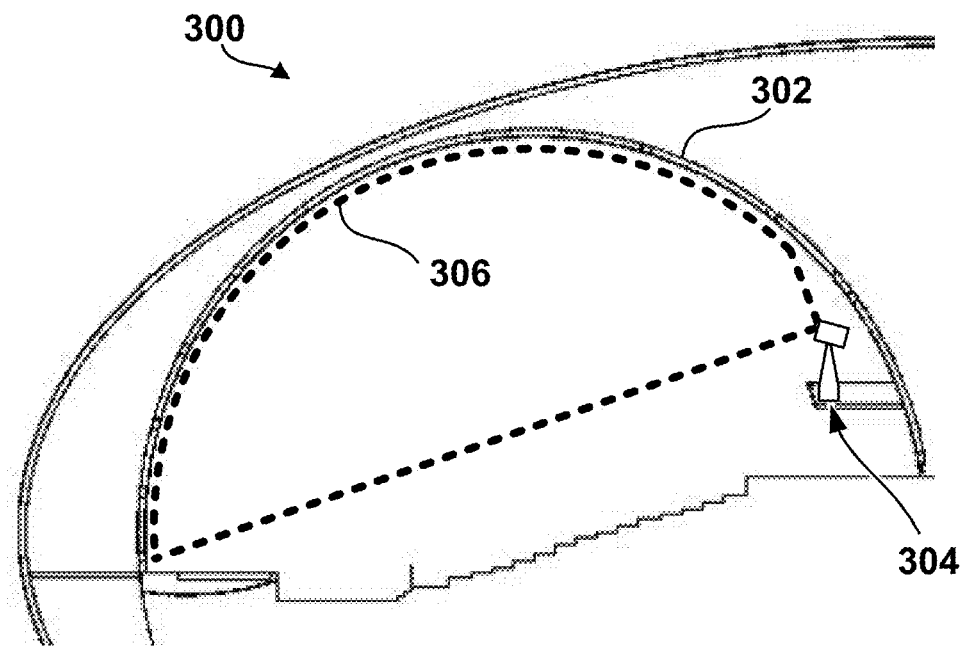
FIG. 3 illustrates an example front-projection arrangement for a theater area.
Figure 4:
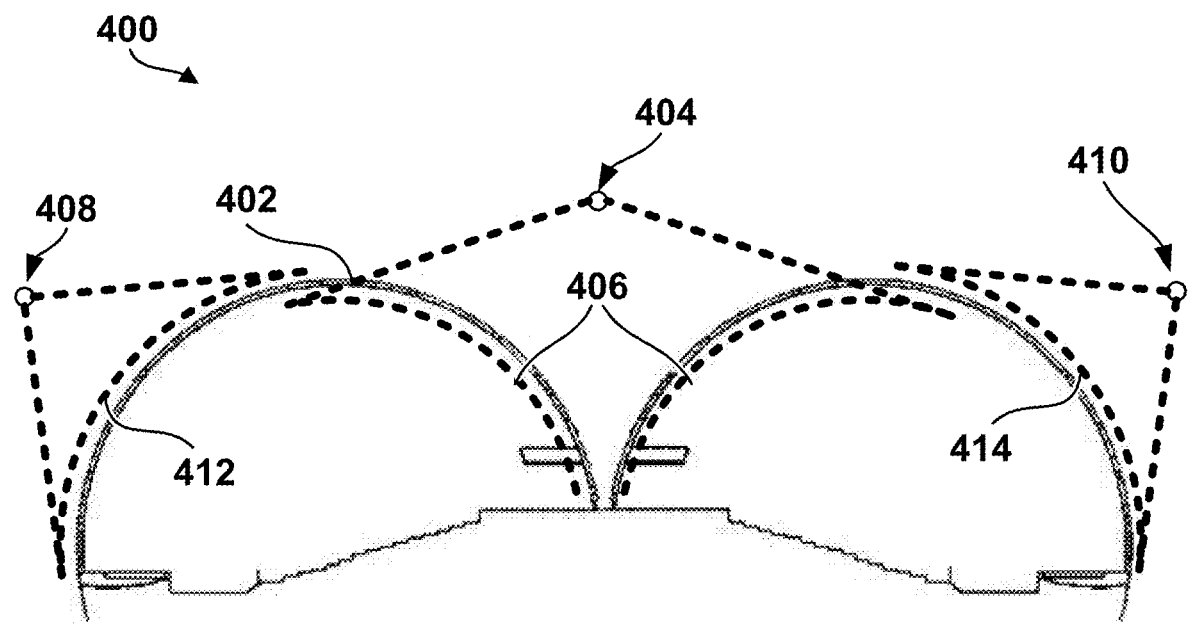
FIG. 4 illustrates an example rear-projection arrangement for a theater area
Figure 5:
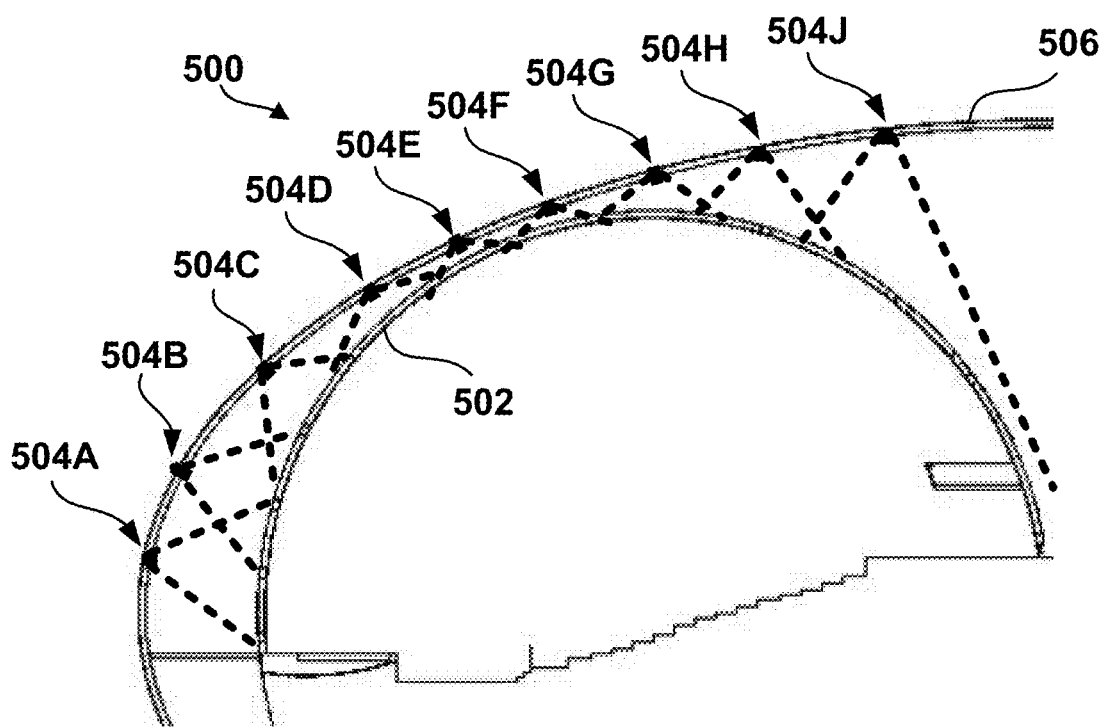
FIG. 5 illustrates an example rear-projection arrangement for a theater area.

The torus-shaped interior structure 104 may present or display images and video in a number of different ways and explorations. For example, one or more projection devices may project images onto, or from, torus-shaped interior structure 104. Such projectors may be placed inside the theater area 106 to project images onto the inside of torus-shaped interior structure 104 (i.e. front projection). FIGS. 2 and 3 show examples of projector arrangements for front projection systems. LED lined screen ideas or implementations. In other embodiments, projectors may be placed around the outside of the theater area to illuminate visible internal portions of the screen by projecting images onto the backside of the screen (i.e., rear projection). FIGS. 4 and 5 show examples of projector arrangements for rear projection systems. In other embodiments, projectors may be placed behind the torus-shaped interior structure 104, projecting images through but themselves, remaining hidden from the audience. A variety of external projector arrangements, similar to those illustrated in FIGS. 2 thru 5 with respect to internal projectors, may also be used.

Various embodiments of the IDS may include: i) front projection upon an opaque screen (perforated aluminum, foam, fabric, etc.); ii) rear projection upon a transparent screen; iii) LEDs covering an opaque support; iv) a composited image comprised of LEDs viewed through a semi-opaque screen (perforated aluminum, projection film backed ETFE, etc.) which reflects a front projected image.

FIG. 2 shows an example projector arrangement 200 for an internal projection implementation. An internal projector arrangement may involve a great many projectors spread around the theater are 106 and/or behind it (e.g. inside a crow's nest, such as 212). In particular, arrangement 200 includes projector 204, projecting on a portion (labeled with arc 208) of screen 202, projector 206, projecting on another portion (labeled with arc 210) of screen 202, and projector 214 (which can be placed either in front of or behind the stage), projecting on a third portion (labeled with arc 216) of screen 202. In some cases, the multiple projectors may project onto different areas of the screen. In other cases, like arrangement 200, the projection areas may overlap or projectors may be stacked on one another. In still other cases, multiple projectors may illuminate substantially the same areas of the screen to increase brightness, luminosity and image resolution.

FIG. 3 shows a second projector arrangement 300 for internal projection. In arrangement 300, a single projector, 304 projects onto screen 302 in a way that substantially covers the screen (labeled with arc 306).

FIG. 4 shows an example rear-projector arrangement 400. In arrangement 400, a multidirectional (in some cases stacked) projector 404 is mounted the center of toroidal screen 402, projecting across the central section of the screen (labeled with arc 406). Additionally as shown, projectors (such as projectors 408 and 410) may also be placed around the outside of toroidal screen 402 to illuminate the outside portions of screen 402 (labeled with arcs 412 and 414). Projectors 408 and 410 are exemplary, however, and outside projectors need not be limited to two projectors mounted on opposite areas of toroidal screen 402. Other projectors may be mounted in a variety of areas, inside or outside of the theater area, and various projectors could project on the same vertical slice of toroidal screen 402 to maintain a high level of quality.

FIG. 5 shows an external projector arrangement 500 that includes nine projectors 504A-504J arranged along the internal side of exterior enclosure 506. Each projector displays across a part of screen 502, including several overlapping areas. In some similar arrangements, projectors (or stacked/parallel sets of projectors) that may be configured to display onto individual areas of the screen, without overlapping.

In any projection system, light-guiding elements may be employed to direct projected light onto one or more display screens or surfaces. For example, an example screen may direct light from projectors to display screens using optical elements such as waveguides, reflective surfaces, lenses, optical fibers, electro-optical deflectors, acousto-optical deflectors and/or beam-splitters, among other elements and devices. As a particular implementation, laser light from one central source may be divided up to shine or reflect on individual portions of the backside of a theater screen.

In addition to light-projection systems, various other visual display devices may produce images on torus-shaped interior structure 104. For example, multiple light sources may be embedded into, in front of, and/or behind the screen to form a multiple image display. Any of various light source types may be used in such an arrangement. For instance, light emitting diodes (LEDs), other electroluminescent components, incandescent light sources, gas discharge sources, lasers, electron emission sources, and/or quantum dot sources may be used to realize the display, among other examples. In particular, low pixel pitch LED arrays may be embedded over the screen surface of a theater screen, so that no projection systems would be necessary, or would provide additional imagery to the projection. In another implementation, torus-shaped interior structure 104 may be optically responsive to electron bombardment (e.g., a fluorescent screen). Then, a cathode-ray source may activate portions of the screen to produce images.

Figure 6:
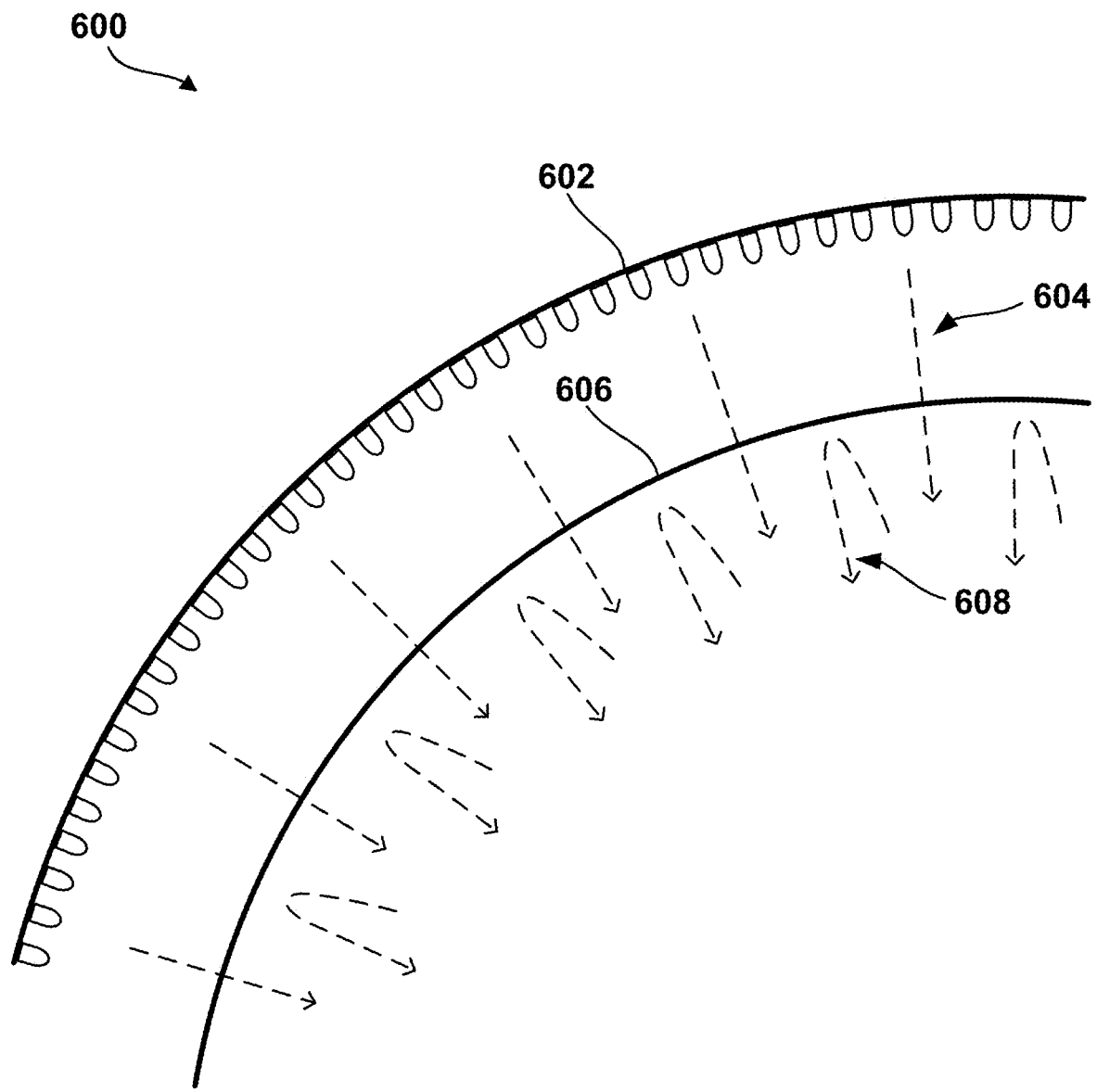
FIG. 6 illustrates an example "Compositing Screen" system.

In some implementations, a display screen may be configured to provide multiple images at once. FIG. 6 shows an expanded view of an example such screen that includes and LED back screen 602 behind a projection-based front screen 606. For example, the front screen may be a material (such as perforated aluminum, or front projection film backed ETFE) or structure that is semipermeable to light emanating from behind it, but also sufficiently reflective of light projected onto its front by a laser projector, allowing such a projector to superimpose an image over the LED back screen. In this way, a 3D three-dimensional image or a "composite" and/or parallax image may be produced by the physical separation between both projected images. Variables such as the opacity percentage of front projection film adheased to ETFE; or void percentage or a perforated aluminum screen and its reflectivity percentage, color; the luminosity of the LED wall, distance between the LED wall and semi-opaque screen, and distance and luminosity of the front projectors may be adjusted to optimize viewing. In FIG. 6, light rays representing the back image are shown as straight dotted lines (e.g., line 604) while light rays representing the front image are shown by reflecting dotted lines (e.g., line 608). As one example implementation, the distance between the front and back screens may be correlated to the depth of the performance stage in the theater, so that displayed images of performers on the stage may convey the distance between the performers and the background. As another example, the distance between the front and back screens may be uniform to maintain the same level of brightness and luminosity and 3D or parallax effect throughout the structure. In certain cases, the background behind the performers may be displayed as the back image, while images of the performers may be displayed as the front image simultaneously or at separate times. Examples of semipermeable screen structures are a perforated aluminum screen (with a sufficiently high void percentage, and sufficiently high reflective coating) vinyl, Teflon, plastic or other, and/or clear ETFE backed with partially transparent front or rear projection film, and with a clear layer of sound absorbent film affixed to its front.

Figure 7:
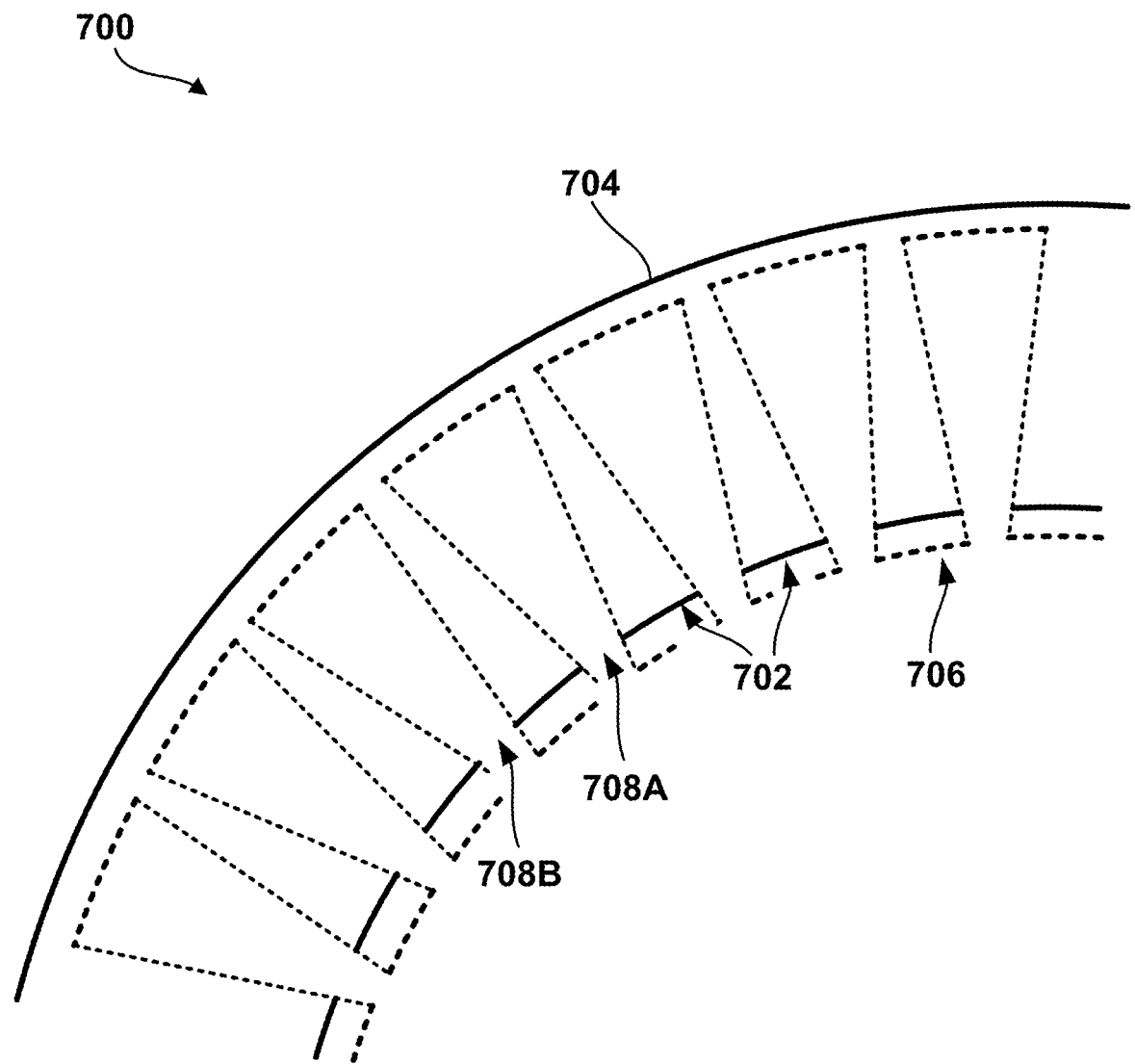
FIG. 7 illustrates an example "Compositing Screen") system.

FIG. 7 shows an expanded view of an example two-image screen system 700 that may be utilized in a projection display system. The screen system includes a non-continuous front, partially perforated screen 702 in front of a continuous, equidistant rear screen 704 creating our composite images to the audience. As shown, some of the light (shown as path 706) that is projected onto screen system 700 impinges on front screen 702, resulting in a front image, while the light that passes through open sections (for example, 708A and 708B) of front screen 702 impinges on back screen 704, producing a back image and a 3D parallax effect for the audience in both standing 108A and seating 108B areas. In some embodiments, front screen 702 may be transmissive to certain light types, rather than having physical gaps or a percentage of perforation in the screen. For example, front screen 702 may be opaque to s-polarized light and transparent to p-polarized light. By projecting light that is a superposition of s-polarized and p-polarized light, the front and back images may then form from the s-polarized and p-polarized light, respectively. In an implementation that uses openings in screen 702, the size and spacing of the openings in the front screen may be chosen such that the front and back images are both visible to viewers. Other combinations are also possible.

The torus-shaped interior structure 104 may also present 3D images. For example, a 3D-glasses or non-glasses autostereoscopic display (ASD) system may be used to polarize or colorize images to create 3D images via left and right visual responses or visual color cone responses to replicate 3D visualization with or without the use of glasses. As another example, the torus-shaped interior structure 104 may include a lenticular array, parallax barrier, holographic, or other autostereoscopic 3D system so that viewers can view 3D images without polarizing or colorizing the images.

Other examples of display systems for both the front and rear screens may include: Front or rear projection, LEDs, laser projection, ASD (autostereoscopic) LEDs, ASD front projection, holography, 3D "ghosting" or full 3D effect (e.g. Pepper's Ghost or Steinmeyer illusion).

In addition to the torus-shaped interior structure 104, secondary display screens such as 114A and 114B may also be included in an example theater area. In some embodiments, secondary screens may be smaller than theater screens and may be provided in front of the theater screen(s). Some secondary screens may be stationary. Other secondary screens may turn and move around a fixed support structure. Some of the secondary screens may be attached to 5 to 7 joint robotic arms. For example, a supporting arm for the secondary screens may include 180 degree to 360 degree pivoting features, allowing the screen some full motion. Some secondary screens may also be able to change position around the theater area, either freely across the entire theater area or in designated areas. Other secondary screens may be housed in quadrants or slices of the theater, for example, to come together in "raids" or function as separate screens. The support system of the secondary screens may attach to a sliding track that facilitates movement of one or more screens across the face of the theater wall or theater screen. The support system may or may not be mounted to the base of the movable performance stage 110. To produce such movements, servos and motors may also be included in the screen support or in the track system.

In some cases, the secondary screens may be controllable by automated or computerized control systems. For example, a screen may be supported on the end of a robotic arm so that the screen direction and position may be controlled as the arm is controlled. As another example, a secondary screen may be mounted on an automated conveyor so that the screen is movable along the length of the conveyor. A display that is movable through control circuitry and/or processors may be considered a robotic screen or a computer-driven screen.

Instead of, or in addition to, the secondary screens, a theater may include holographic, Steinmeyer illusion, and/or pepper's ghost apparatuses as a means of "image propagation" by which a live performer who is performing on a portion of the stage which is not presently in front of a given audience segment, may be seen virtually by that audience segment via holographic cannons or other 3D generating technology or devices.

Instead of, or in addition to, the secondary screens, and/or holographic, Steinmeyer illusion, and/or pepper's ghost apparatuses, a theater may include tertiary screens located in the audience area 108B, on the backside of the seat headrest (or directly above the headrest at eye level, in front of an audience member viewing it).

System Design and Implementation

To facilitate using the entertainment venue, a variety of supporting systems may also be included. Some supporting systems are described herein with regard to features that are not used in a typical movie or live-theater setting while others are not specifically mentioned by name or described herein. Other systems and structures may also support the entertainment venue; but those may be obvious to persons of skill in the art. In some embodiments, processing of both audio and video feeds and/or equipment may be run under the stage or audience. In other embodiments, support equipment may run on the outside of the torus-shaped interior structure 104 or in the nest area 116 shown in FIG. 1.

I. Video Processing

In order to display an image internally onto the torus-shaped interior structure 104 and externally onto a dome screen 102, various specialized pieces of equipment and/or processing techniques may be helpful or required. For example, to display images that were originally intended for flat surfaces, may require a new image capture process, and/or a new way of processing after capture for the images to display on a toroidal screen, an ellipsoidal screen, and in a 360° or continuous format. Image capture processes may include filming the reflection off a mirrored torus shape, or images may be captured by specially ground lenses, 3D lenses, fish eyed, or 360° lenses, such that there is no visual distortion when exhibited on a torus, or ellipsoid shaped screens, with no breaks or gaps in the continuous image, and/or non-repeating images to break the flow of the image. In an example embodiment, a toroidal screen may be used to display images with a horizontal field of view (FOV) of 360° and a vertical FOV above 200°. In some embodiments, a display may present individual videos or images over a smaller portion of the screen, avoiding the need for capturing large FOV images. In other embodiments, several image capture devices (e.g., cameras, video cameras, photodiodes, etc.) may each capture a portion of the full FOV image. Then, the images captured by each device may be combined into a full FOV image/video. Additionally or alternatively, lenses, fibers, waveguides, and reflectors may be used to direct the light that defines a full FOV image into an image capture device. For example, a curved lens can refract light towards the image-capturing device. As another example, a curved reflector may reflect light towards the image-capture mechanism. As still another example, an array of optical fibers may be used to guide the light into the image-capturing device.

In order to present images on a curved surface, like torus-shaped interior structure 104, the images may be processed to map flat-surface coordinates to curved-surface coordinates so that the images do not appear stretched or distorted. As one implementation, the image may be represented by a set of points in a particular coordinate system. The coordinate system employed may depend on the system used to capture the image. For example, if a set of cameras each captures a flat-surface representation of the view in one direction, the image points may fit most naturally into a Cartesian coordinate system. To fit such an image into the coordinate system, each image is associated with a capture direction and is assigned a certain apparent depth in the viewing direction. In an array of image-capture devices, the capture direction of one device may be implied from the orientation of that device with respect to the other devices. When a curved or other shaped lens is used, the image direction may be determined from geometric light-ray calculations on the lens shape. Once the three-dimensional image coordinates have been determined, a three-dimensional grid of points representing the image-projection surface (e.g., a toroid, etc.) is mapped to the image coordinates to determine the relationship between each capture-image point and each display-image point. For example, if a display-image point falls directly on a capture-image point, then the color associated with that capture-image point becomes the color of the corresponding display-image point. If a display-image point falls between four capture-image points, the color of the display-image point may be an average of the colors associated with the capture-image points. Once the relationship between each display-image point and the corresponding capture-image point(s) is determined, the system may use the relationships to quickly produce a display image defined by the display-image points, rather than mapping each new set of images to the projection surface. Other techniques are possible.

To display video that is captured at the venue (e.g., video of live performers during the live performance), the quick processing techniques may ensure that the videos are processed fast enough to present the images in real time in 2D and/or 3D imagery. Additionally, in order to capture images at the venue, cameras may be placed in specific areas around the theater, inside and out. In some cases, multiple cameras may be attached to rotating supports that move in sync with the moving performance stage to maintain a video feed from the performers.

Some systems may require additional processing for display. For example, the projection system shown in FIG. 5 may require the display-image to be broken into two, three, or four segments representing the images for projections 508 and 510. The image for projection 510 may also need mapping or projection mapping to the reflective surface or surfaces, including image inversion and other processing.

II. Audio Systems

Each of the embodiments of visual exhibition system (IDS) described above in 0033 has an acoustical counterpart to accompany it: i) in the case of the front projection upon an opaque screen (perforated aluminum, foam, fabric, etc.), both speakers a sound absorptive material (such as fiberglass) could be placed behind a perforated aluminum screen which is mostly transparent to sound. The speakers would propagate the audio while the fiberglass would deaden the otherwise acoustically live space, and control reflected sound. If foam or fabric was the medium used for the screen, that medium itself would deaden reflected vibrations by absorbing the same, while the foam or fabric could be made thinner directly in front of the speaker drivers, allowing the primary intended audio to pass freely through and out to the audience; ii) in the case of rear projection upon a transparent screen, that screen could have sound a clear sound absorptive film adheased to the front of it, which would control secondary audio reflections, while speakers could be placed in the house and directed towards the audience; iii) in the case of LEDs covering an opaque support, transparent LED panels could be used which provide a lot of space between LED, allowing the sound to pass through, and as with the perforated aluminum option above, speakers and fiberglass could be placed behind the panels; iv) in the case of a composited image comprised of LEDs viewed through a semi-opaque screen which reflects a front projected image, that semi opaque screen could be made of perforated aluminum, which is mostly transparent to audio, allowing sound to pass through it in either direction. The LED "back screen" behind it, would then have the acoustical/audio system described above in (iii), with speakers and fiberglass behind transparent LED panels.

Additional acoustical management solutions may include positioning speakers upstage and angling them up and away from the audience, into the torus shape, turning the torus itself into an audio propagation device (a giant speaker cabinet).

The systems above could work in conjunction with an in-seat audio system, described in patent app "360 Squared Sound".

Audio systems may be provided in an exemplary theater area. Audio input devices may be provided to support sounds associated with live performances. For example, musical acts may use input devices to capture voice and instrument sounds. As another example, stage acts may use microphones to capture on-stage voices and sound effects. Audio output devices may output these captured sounds and other audio associated with live performances or video displays. And audio may also be transmitted wirelessly to in ear monitors or the stage performers, and from wireless microphones and direct inputs form the instruments and voices on the instruments and people on the rotating stage, to receivers by the mixing console.

In another embodiment, there could be a contiguous circle of speaker wedges in front of the rotating stage, angled up to the onstage performers. As opposed to the "monitor mix" engineer mixing for the individual wedge, he could mix for the individual performer, and a computer which tracks the performers position (by RFID, visual recognition, etc.) could automatically pan the audio to his position on the stage.

Audio output devices, such as speakers, may be provided in any of various locations inside or outside of the theater area, and speakers may be existing or new technologies, or a mix of both for this specific venue. For example, speakers may be provided on or around the stage area, around the secondary display screens, and/or under and around the audience area. Moreover, in some cases, individual speaker systems may be provided within the audience seating area (e.g., chair-mounted speakers). In some embodiments, speakers may be provided behind or within the theater screen.

The implementation and orientation of the speakers and audio system may vary based on various factors. For example, the implementation may change based on the usage of a one screen or a two screen system. As another example, the implementation may change based on whether an in-front and/or a behind-the-screen implementation is used. Such variations may follow in accordance with particular audio requirements and in such a fashion as to deaden reflected secondary sound waves, which may otherwise result from the theater or screen design and screen elements.

Audio may be comprised of several speaker based solutions including a pre-existing conventional speaker option (interspersed vertically and horizontally throughout the venue), and/or newer developed solutions to provide optimal 360° sound, which does not create reverberation and/or reflective waves which would disrupt and affect the audio clarity of the audience. Any and all of our audio systems can be augmented and/or modified, supplemented or added to by several in-seat audio solutions, which may or may not be binaural (accomplished without headphones by drivers set into the headrest providing isolated distinct sound to each ear).

In order to provide a stable, coherent image on the theater screens, and optimal audio quality, several solutions for sound dampening elements may cover up and/or protect parts of the screen that are more susceptible to audio acoustic vibrations, reflections, or reverberation.

In a front-projection-only example, or a one-screen IDS solution, such as the system shown in FIGS. 2 and 3, speakers may be placed behind the front projection surface, or screen, by using a "foam" screen. Such a foam screen may deaden reflected secondary sound waves. As another example, a screen material that is practically transparent to sound (like perforated aluminum) may have both speakers and sound deadening material placed behind it, thereby preventing the sound system from impairing the audience's view of the screen).

In a composite or two-screen solution (e.g., the "Compositing Screen"), such as the system shown in FIGS. 6 and 7, where both a front projection screen surface (such as a perforated surface) and a back LED screen surface are used, both speakers and a sound absorptive material such as fiberglass may be placed behind the back LED surface. In another implementation, LEDs may cover the speaker grills to create a seamless visual experience with sound deadening properties.

In another audio solution (utilized in conjunction with a "Compositing Screen" two screen system, or a one screen front projected and/or LED lined system), an active noise cancelation system may be employed. In this example, a transparent Mylar, plastic, or other material would cover all or part of the inside facing surface of the front screen, and would be wired to act as speakers and microphones. In such an implementation, small sections, interspersed across the screen area, may be wired to act as microphones. Additionally, other adjacent sections may be interspersed adjacent to the microphone areas and may be wired to act as speakers. The speakers may cancel sound detected by the microphones by, for example, producing an out-of-phase acoustic wave of the sound detected by the adjacent microphone section. Further, additional sections of the covering may be wired to act as speakers that would transmit audio intended to be heard by the audience (i.e., music, dialogue, sound effects, etc.). In this way, the torus itself (as a structure) acts as both a speaker system and an acoustical deadening solution.

In another embodiment, soundproofing and speakers may be placed behind the LED surface with speaker grills covered in LEDs. Spaces between the LEDs may make the LED panels at least partially transparent to audio, allowing the speakers to present audio to the audience through the led screen.

As another example, a vacuum established between the front screen and a protective back screen "shield" may prevent sound waves from propagating to the front screen and exposing reflective audio waves to the audience.

In still another example, the screen may be made "transparent" to sound via gaps in the screen through which sound waves flow without disturbing the screen and without creating reflections. Aside from the gaps, sound-absorbing material or active cancelation systems may cover the back of the screen. In this way, the screen shield may deaden the sound while also allowing sound to pass through the gaps in the surface.

In another embodiment, a fabric that we project upon can also be totally transparent to sound, and can be backed by a totally sound absorbent material (e.g., fiberglass) except where speakers are placed. To facilitate such an implementation, the speakers may be grouped behind a very small percentage of the overall screen surface area.

III. Stage Supports

To support movement of a performance stage, moving stage supports may be provided beneath the stage. Mechanical supports may include, for instance, conveyors, rollers, conveyor belts, sliding elements, wheels, rollers, motors, gears, tracks, elevators, hydraulic systems, and maglev supports. The supports may be controllable by, for instance, manual controls, computer applications, remote controls, and/or stored control routines. For example, stored pre-created routines may include the movement patterns to use throughout a performance. In such an implementation, the stored routines may be executed at the start, middle or end of the performance to cause the stage to begin an intended movement pattern or spontaneous patterns throughout.

To the extent it may be necessary to get electricity to any devices on the rotating stage, a metal strip affixed to the bottom of the rotating portion of the stage may contact a fixed metal connector to supply electrical current to the rotating stage. Any brush, braid, carbon slip-plate, or other electrical contact may be used in such a system. Additionally, non-contact electrical transfer techniques (e.g., capacitive, inductive, active magnetic energy transfer) may also be utilized.

Other control mechanisms may also facilitate performance stage movement. In practice, safety controls may provide resources for slowing or stopping the motion of the stage in response to receiving alarm indications from sensors. For example, an audio or visual alarm may indicate that a performer or "setpiece" is off, or partially off, the stage. In response to detecting that something is moving or has moved on/off the stage, the controls may slow or stop the movement. In some cases, the controls may slow or stop the movement before a performer or prop goes over the edge of the stage. In particular, a controller may detect the distance between the object and the edge and slow stage movement in proportion to the detected distance. Likewise, sensors may detect the distance between the edge of the moving stage and objects/people on the stationary areas around the stage, to help prevent injuries.

To further prevent injuries, there may also be a protective raise that becomes active in response to determining that a performer is too close to the edge of the moving stage (or too close to an area of the stage that is not moving at the rate of the performer). This raise may follow the stage extensions if the stage moves forward and backward, as opposed to side-to-side. Furthermore, the movement controller may slow the stage in preparation for a stage entrance, exit, or collision. Such movement changes may also be determined by the proximity of the performer to the stage edge. As another example, an alarm may indicate that a microphone or speaker has moved to a position that is likely to cause audio feedback. As still another example, an alarm may indicate that a stage prop is blocking an emergency exit from the stage or safety equipment. In response to detecting that something or someone on the stage is not in a safe location, the movement controller may ensure that the stage moves to an orientation where the misplaced person or thing is better positioned.

In addition to safety sensors, sensing devices may also be used as stage cues to allow control systems to automatically detect when movement patterns should change, rather than relying on operators. For example, a performer who wishes to leave the stage during a performance and return to the stage later in the performance, may desire that the stage remains stationary until the performer returns. In this case, some of the movement of the stage may be pre-programmed and also controlled by a controller who may pre-program the stage to, first, stop stage movement in response to detecting the performer's egress and, second, resume stage movement in response to detecting the performer's return. As another example, the detected position of a particular prop or instrument may be used as an indication of how the stage should move. As still another example, a performer's on-stage movement may affect the stage movement. For instance, to facilitate a play that includes a scene in which a performer walks between two other scenes, a stage-control program may detect or receive indications of the performers walking speed and the time at which they begin walking. In response, the stage may move to keep the performer in an active area of the stage, while they are walking.

Safety and other sensors may include various detection devices and processing components. For example, proximity sensors may indicate the position of a performer or setpiece on the stage and/or indicate that a performer has moved off the moving performance stage. Proximity sensors may also detect any person or thing that is extending over the edge of the stage. As another example, pressure sensors in the stage floor may indicate whether a performer is on or off the stage. Feedback sensing circuits or devices may indicate whether a speaker or microphone is in a bad acoustic location. Various other sensors may be used in an exemplary embodiment.

As mentioned earlier, some stages may include moving and non-moving portions. For example, the inside ⅔rds of the stage (the portion of the stage that is closest to the audience) may rotate around the audience while the outside ⅓rd of the stage remains stationary. In some implementations, the outside portion may not be movable at all. In other implementations, the outside may be separately movable from the inside portion. Other example stage support systems may involve various independently movable and/or non-movable portions to support complex stage-movement patterns.

Also mentioned earlier, the described systems and techniques for stage movement may be used alternatively for audience movement. In such an implementation, the movement of the audience with respect to a stationary (or independently moving) stage may be controlled in the various ways that are described above with respect to stage movement.

Venue Uses

Figure 8:
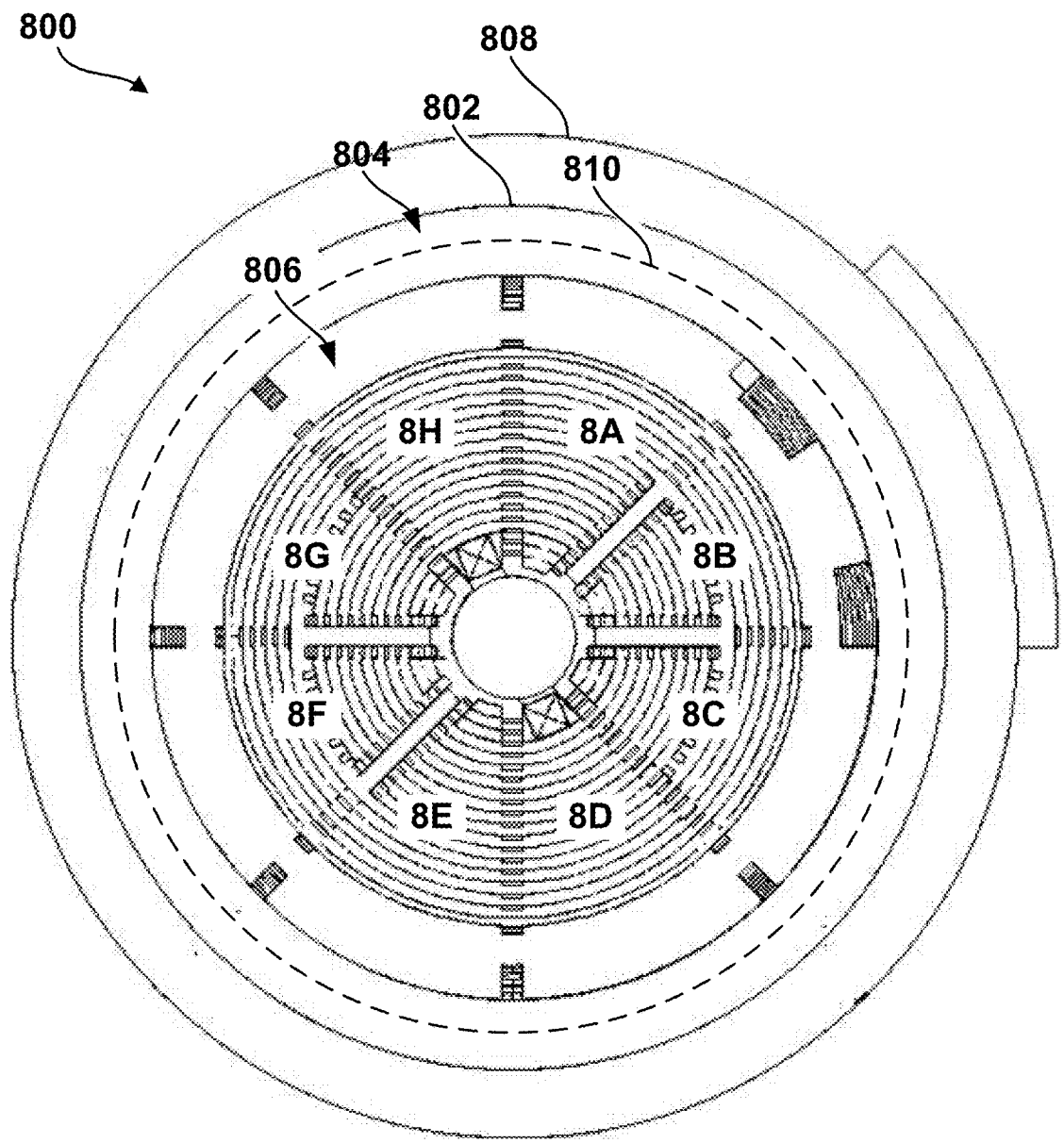
FIG. 8 illustrates an example arrangement of the rotating, split performance stage, the standing room and audience seating areas around the stage, screen and ellipsoid as seen from above.

FIG. 8 shows an overhead view of an example toroidal theater encased within an ellipsoidal structure 800, including a toroidal screen 802, a circular stage area 804, an external enclosure 808, and an audience area. The audience area contains a standing room area 806 directly in front of circular stage 804, and eight GA and VIP seating sections, labeled 8A-8H. Other embodiments may divide areas in other ways and may include additional seating, aisles, handicapped seating and other non-seating areas. Dotted line 810 divides stage area 806 roughly in half. In some embodiments, the two halves (or ⅓rd and the other ⅔rds of stage 806 may move (or not move) independently of each other.

In some cases, a single theater area may be used simultaneously for multiple functions. In particular, some seating sections (such as sections 8A and 8D of FIG. 8) see substantially different portions of screen 802 and stage 804. Therefore, a different event could take place in each side of theater 800 without significantly detracting from either event. In some cases, temporary barriers may be erected or moved between the theater sections to separate the sections, both visually and acoustically. Temporary barriers or separations may include various features, such as soundproofing components (e.g., fiberglass sheets) and/or more or less display screens depending on the needs of the theater. The separation of a theater into two equal-sized sections is only exemplary; a theater may be divided into any number and size of sections for independent use.

I. Using a Rotating Performance Stage

As described above with respect to the design of stage supports, the movement of a performance stage may be controlled in a variety of ways. In addition to controlling the movement and positioning of a stage, the arrangement of performers, audience, and display systems may also require specialized techniques. For example, performers need not be placed directly together on the stage because different sections of the stage may be visible to different sections of the audience at any given time. As another example, the distribution of the audience may influence how the stage movement progresses. As yet another example, the motion of the stage may be synchronized with the projected moving images to compliment them and create a more convincing perception of motion, such that the audience feels that it is they (and not the projected images or stage) that are moving.

Figure 9:
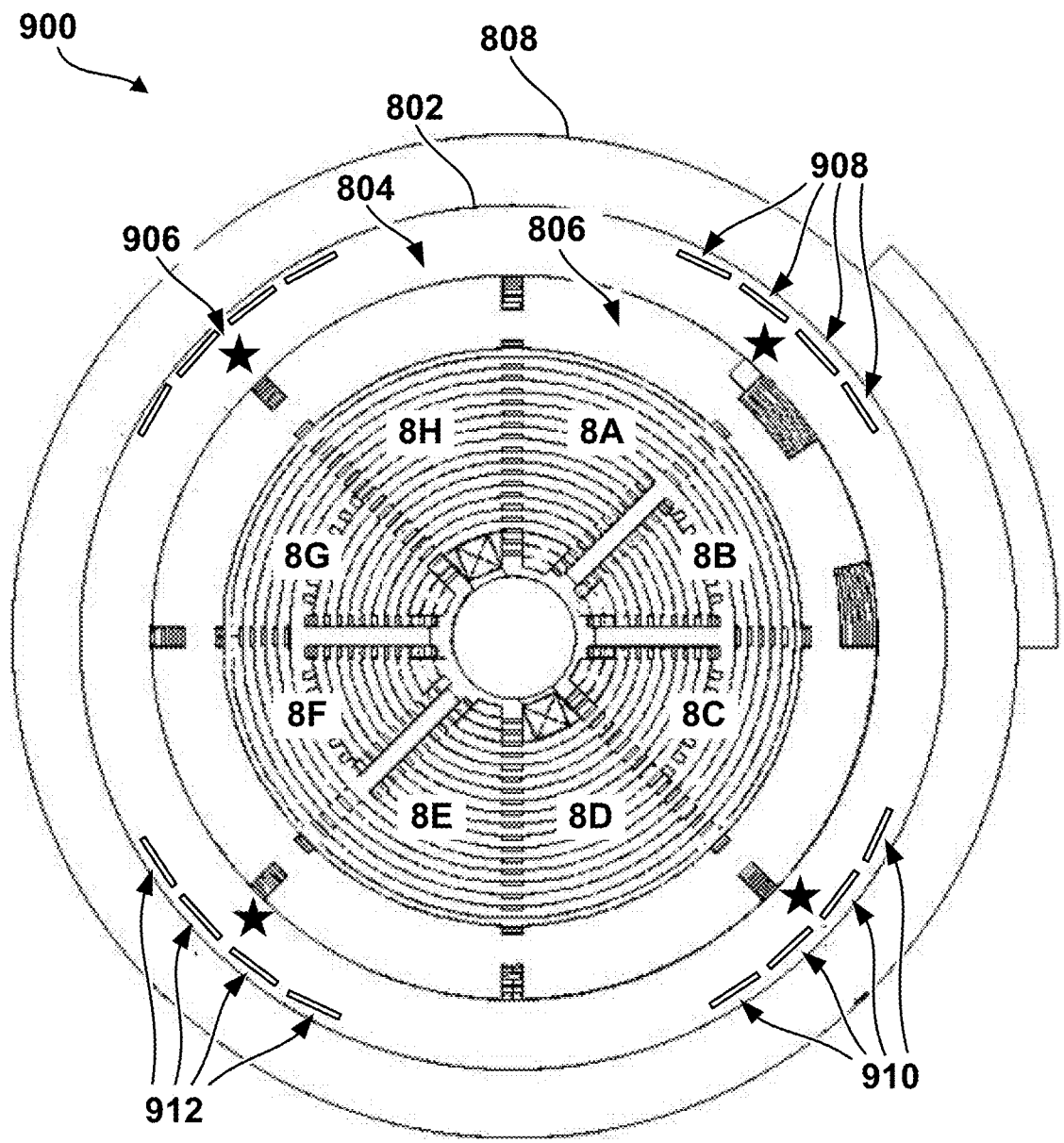
FIG. 9 is an example arrangement of performers (as "stars") and secondary motion screens around the stage in the theater area of FIG. 7.

In some cases, performers may be spaced evenly around the stage. For example, FIG. 9 shows an example arrangement 900 of four musicians (shown as stars, including star 906) of a band that is performing on circular stage 804 within toroidal screen 802. As shown, each of the members may be positioned at equal distances from one another to produce a square formation with each musician defining a vertex of the square. Any number of stage performers or features may be spaced evenly around a rotating stage or at random points. As the stage 804 rotates, different sections of the audience are able to see different performers. Such an arrangement minimizes the amount of time that a viewer cannot see any performer. Performers not directly in view can be seen via the various exhibition systems and surfaces, until they rotate into view, and while that portion of the audience watches another performer in person.

Also shown in FIG. 9, clusters of secondary screens (e.g., clusters 908, 910, and 912) are included. Such secondary screens may rotate with the performers on the stage, so that the same set of screens are behind/beside the same performer throughout a performance or the screens may rotate or move in a pre-programmed pattern. In one embodiment, the secondary screens may be clustered together. In another embodiment, the secondary screens may not form clusters. Screens around or behind a performer may display images of the other performers on the other sections of the stage, so that an image of each performer is displayed in each group of screens. In other arrangements, the performer that is in front of a screen cluster may not be included in the images, so that all the performers are seen on any of the sides of the stage, but one of the performers is seen live at any time and the other performers are displayed on secondary screens (i.e., an image of performer 906 would appear on a screen from each of clusters 908, 910, and 912, but not on the screens behind star 906). In some cases, other display media (e.g., holographic, Pepper's Ghost, or Steinmeyer illusion displays) may provide the "images" of the other band members. In this way, lifelike virtual band members may perform alongside one another and one real band member in four places around the stage, giving the impression that the full band is in front of four different audiences.

Although FIG. 9 shows four groupings of four secondary screens each, any number of clusters, containing any number of screens may be used. For example, four clusters of three screens may be used, or three clusters of six screens. In some cases, the position of the screens may be changeable. In this way, clusters of screens may be changed to group different numbers of screens in different ways, or the screens may be unclustered and spread out across the stage area.

Some performances that are not suitable to spacing apart performers (e.g., some plays and musicals, musical groups in which proximity is important, dialogs between performers, etc.), may take advantage of the unique stage shape by spacing scenes around the stage. In particular, if a play (or an act of a play) has four main scenes, then the setpieces and props for each scene may be placed at each of star locations. Among other advantages, this arrangement would allow a stage crew to set up all of the scenes before the performance, rather than changing sets during scene changes. Additionally, the narrative presented in a multiple-scene performance may be easier to understand when different scenes occupy different physical locations on the stage.

In some embodiments, the movement of the stage may be determined from the position of the audience. For example, an operator may input computer code that indicates that only sections 8A and 8B of the theater are occupied. In response, the system may implement a movement pattern that only presents a view of the live performers to sections 8A and 8B. In some cases, a portion of stage 804 may be visible to all of the audience members, without needing the stage to move at all. In that case, the stage movement may be used to assist in the movement of props/sets rather than moving performers. For example, prior to performance of a play, a crew may organize the set, props, and stage markers for each scene in the play in a different section of the moving stage. During the play, the crew can simply turn the stage until the right set is in the active portion of the stage rather than constructing and deconstructing each set during scene changes.

II. Combining Live and Recorded Entertainment

As described above, some theater areas may include live performance stages and live and/or pre-produced visual displays. For some events, the display screens or the performance stages may be used on their own. For example, movies may be shown on the theater screens without using any stages. Likewise, performance stages may be used for live acts without using the display screens. Other entertainment events may combine live performance and displayed images/video.

In some combined events, the screen images may include live video or images of the performers on the performance stage. For example, the screens may present images of the stage performers that are not visible to a section of the audience. In particular, while a performer is located at star 906 in FIG. 9, the system may determine that the performer is not visible to viewers in sections 8A-8F and, in response to the determination, the system may display video of the performer on portions of screen 802 that are visible to sections 8A-8F. Then, when the performer moves into view to the audience in sections 8A-8F, the system may detect this movement and responsively change the video of this performer to a video of a performer who is no longer visible in sections 8A-8F. In other arrangements, videos displayed on screen 802 may rotate in accordance with the movements of the stage. In this way, videos of each performer are presented to the audience while the performer is not in view. In still other arrangements, the system or a live director may select which videos to show based on criteria other than the movement of performers. For example, screen 802 may present videos of each performer at all times, regardless of the position of the performer. As another example, the system may switch between video feeds in accordance with preset timings or on-stage cues (e.g., detect guitar solo from a sound signal and responsively switch to video of guitarist.) This live performance footage can also be intercut in real time with prerecorded purpose-shot content (i.e., live and pre-produced content is shown simultaneously and/or separately at various intervals throughout the performance).

In some embodiments, action on the stage may affect or add to the displayed images. For example, images that are presented as a background for certain scenes in a performance may change when the scene of the performance changes. In other embodiments, on-stage actions may not directly affect or add to the displayed images. For example, screen 802 may present a background image or video simply as a backdrop for stage performers. As another example, the live performance may be designed to coincide with displayed images, but the images may be controlled independently of the on-stage action. One example of a designed coordination between live performance and video displays is a live-scored movie presentation, in which live performers provide the musical accompaniment to a movie presentation.

As yet another example, projected moving images can be combined with live action on stage to meld live performers with a virtual setting (i.e., certain movements (say, a fight sequence) can be choreographed. Camera moves can also be choreographed to capture performers rehearsing that sequence. The scene can then be filmed with the choreographed camera moves, but without the actors in frame. When the film is exhibited, live performers can then recreate the same choreography live on stage, and it should create the net effect of the live actor actually being present in the virtual environment.

CONCLUSION

The construction and arrangement of the elements of the video and audio systems and methods as shown in the exemplary embodiments are illustrative only. Although only a few embodiments of the present disclosure have been described in detail, those skilled in the art who review this disclosure will readily appreciate that many modifications or alterations are possible over the course of each construction (e.g., variations in sizes, dimensions, structures, shapes and proportions of the various elements, values of parameters, mounting arrangements, use of materials, colors, orientations, etc.) especially when components are built to specifications, without materially departing from the novel teachings and advantages of the subject matter recited. For example, elements shown as integrally formed may be constructed of multiple parts or elements, with slight or major modifications but not modifications in overall principals or strategies. The elements and assemblies may be constructed from any of a wide variety of materials that provide sufficient strength or durability, in any of a wide variety of colors, textures, and combinations. Additionally, in the subject description, the word "exemplary" is used to mean serving as an example, instance or illustration. Any embodiment or design described herein as "exemplary" is not necessarily to be construed as preferred or advantageous over other embodiments or designs. Rather, use of the word exemplary is intended to present concepts in a concrete manner. Accordingly, all such modifications are intended to be included within the scope of the present disclosure. The order or sequence of any process or method steps may be varied or re-sequenced according to alternative embodiments. Any means-plus-function clause is intended to cover the structures described herein as performing the recited function and not only structural equivalents but also equivalent structures. Other substitutions, modifications, changes, and omissions may be made in the overall design, operating conditions, and arrangement of the preferred and other exemplary embodiments without departing from the actual scope (or baseline ideas, thoughts, principals, etc.) of the present disclosure or from the scope of the appended claims.

Although the figures show a specific order of method steps, the order of the steps may differ from what is depicted, especially in the construction process of the various elements within. Also, two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

The invention claimed is:

1. A venue comprising:
a display screen, wherein the display screen is fixed;
an audience seating area surrounded by the display screen, wherein the display screen is shaped such that a first portion of the display screen is positioned in front of the audience seating area and a second portion of the display screen is positioned behind the audience seating area;
a first performance stage; and
a second performance stage;
wherein the first performance stage entirely encircles the audience seating area; and
wherein the audience seating area entirely encircles the second performance stage.

2. A venue comprising:
a display screen, wherein the display screen is fixed;
an audience seating area surrounded by the display screen, wherein the display screen is shaped such that an inner portion of the display screen is positioned in front of the audience seating area and an outer portion of the display screen is positioned behind the audience seating area; and
a performance stage;
wherein the audience seating area encircles the performance stage;
wherein the performance stage extends along a periphery of the inner portion of the display screen and
wherein seats of the audience seating area face toward the performance stage.

3. A venue comprising:
a display screen, wherein the display screen is fixed;
an audience seating area surrounded by the display screen, wherein the display screen is shaped such that an outer portion of the display screen is positioned in front of the audience seating area and an inner portion of the display screen is positioned behind the audience seating area; and
a performance stage;
wherein the performance stage encircles the audience seating area;
wherein the performance stage extends along a periphery of the outer portion of the display screen; and
wherein seats of the audience seating area face toward the performance stage.

4. A venue comprising:
an exterior structure having an exterior surface that provides or supports a first display;
an interior structure positioned inside of the exterior structure with open space positioned between the exterior structure and the interior structure, the interior structure including an interior surface that provides or supports a second display, the interior structure defining a theater area;
a stage positioned in the theater area;
an audience seating area positioned in the theater area and facing the stage, the audience seating area having a plurality of levels of seating; and
a mezzanine area positioned inside the exterior structure, outside of the theater area, and at least partially beneath the audience seating area;
wherein the first display extends along a majority of the exterior surface; and
wherein the second display is an immersive display that extends along the interior surface such that the second display is positioned in front of, to the sides, above, and behind at least a portion of the audience seating area.

5. The venue of claim 4, wherein the exterior structure forms a dome around the interior structure, and wherein the dome has an ellipsoidal shape, a spherical shape, a hemispherical shape, a cubic shape, a rectangular prism shape, a pyramid shape, a conical shape, a cylindrical shape, a prismatic shape, or a toroidal shape.

6. The venue of claim 4, wherein interior surface is shaped such that the immersive display has an ellipsoidal shape, a spherical shape, a hemispherical shape, a cubic shape, a rectangular prism shape, a pyramid shape, a conical shape, a cylindrical shape, a prismatic shape, or a toroidal shape.

7. The venue of claim 4, wherein the exterior structure and the interior structure both have a spherical dome-like shape.

8. The venue of claim 4, wherein the audience seating area is arranged in a curved orientation and at least partially encircles the stage.

9. The venue of claim 4, further comprising a plurality of first display elements at least one of (i) embedded within the exterior structure, (ii) attached directly to and along the exterior surface, (iii) positioned internal to the exterior structure between the interior structure and the exterior structure, or (iv) positioned external to and not physically attached to the exterior surface, wherein the plurality of first display elements facilitate providing the first display.

10. The venue of claim 9, wherein the plurality of first display elements are embedded within the exterior structure.

11. The venue of claim 9, wherein the plurality of first display elements are attached directly to and along the exterior surface.

12. The venue of claim 9, wherein the plurality of first display elements are positioned internal to the exterior structure between the interior structure and the exterior structure.

13. The venue of claim 9, wherein the plurality of first display elements are positioned external to and not physically attached to the exterior surface.

14. The venue of claim 4, further comprising a plurality of second display elements coupled to the interior surface, wherein the plurality of second display elements facilitate providing the second display, and wherein the plurality of second display elements comprise light-emitting diodes.

15. The venue of claim 4, further comprising a plurality of second display elements positioned to facilitate providing the second display, wherein the plurality of second display elements comprise projectors at least one of (i) positioned within the theater area or (ii) positioned external to the interior structure between the interior structure and the exterior structure.

* * * * *